US008873833B2

(12) United States Patent
Yu et al.

(10) Patent No.: US 8,873,833 B2
(45) Date of Patent: Oct. 28, 2014

(54) SYSTEM AND METHOD FOR EFFECTIVELY PERFORMING A SCENE REPRESENTATION PROCEDURE

(75) Inventors: Liangyin Yu, Fremont, CA (US); Ming-Chang Liu, San Jose, CA (US); Ximin Zhang, San Jose, CA (US)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 13/398,948

(22) Filed: Feb. 17, 2012

(65) Prior Publication Data

US 2013/0216134 A1  Aug. 22, 2013

(51) Int. Cl.
*G06K 9/00* (2006.01)

(52) U.S. Cl.
USPC .......................................................... 382/154

(58) Field of Classification Search
USPC .......................................... 382/173; 345/474
See application file for complete search history.

(56) References Cited

U.S. PATENT DOCUMENTS

| | | | |
|---|---|---|---|
| 6,154,215 A | 11/2000 | Hopcroft et al. | |
| 6,504,951 B1 | 1/2003 | Luo et al. | |
| 6,856,322 B1 * | 2/2005 | Marrin et al. | 345/629 |
| 7,062,085 B2 | 6/2006 | Luo et al. | |
| 7,505,178 B2 | 3/2009 | Erol et al. | |
| 2002/0036639 A1 * | 3/2002 | Bourges-Sevenier | 345/474 |
| 2007/0263900 A1 | 11/2007 | Medasani et al. | |

FOREIGN PATENT DOCUMENTS

| | | |
|---|---|---|
| WO | WO2005076197 A2 | 8/2005 |
| WO | WO2010014067 A1 | 2/2010 |

OTHER PUBLICATIONS

Thang V. Pham;Arnold W.M.Smeulders, Learning Spatial Relations in Object Recognition, Jul. 14, 2004, http://perso.telecom-paristech.fr/~bloch/P6/IREC/PRL06.pdf, ISIS, Informatics Institute, University of Amsterdam, Kruislaan 403 1098 SJ Amsterdam, The Netherlands, pp. 1-12.
Walaa Aly, Seiichi Uchida, Akio Fujiyoshi, Masakazu Suzuki., Statistical Classification of Spatial Relationships Among Mathematical Symbols, http://www.cvc.uab.es/icdar2009/papers/3725b350.pdf, 2009, p. 1350-1354.
Singhal, A. Jiebo Luo, Brown, C., A Multileval Bayesian Network Approach to Image Sensor Fusion, http://ieeexplore.ieee.org/Xplore/login.jsp?url=http%3A%2F%2Fieeexplore.ieee.org%2Fiel5%2F6940%2F18648%2F00859826.pdf%3Famumber%3D859826&authDecision=-203, Jul. 13, 2000, Dept. of Comput. Sci., Rochester Univ., NY, USA, p. 1.

* cited by examiner

*Primary Examiner* — Hadi Akhavannik
(74) *Attorney, Agent, or Firm* — Gregory J. Koerner; Redwood Patent Law

(57) ABSTRACT

A system for performing a scene representation procedure includes an image manager that processes source images from a given scene to define subscenes in the source images. The image manager creates an image understanding graph for each of the source images, and also creates a scene representation graph for each of the source images based upon the corresponding subscenes and certain image characteristics. The image manager further generates an integrated scene representation to represent all of the source images with a single representation. A processor of an electronic device controls the image manager to perform the scene representation procedure.

20 Claims, 10 Drawing Sheets

SYSTEM AND METHOD FOR EFFECTIVELY PERFORMING A SCENE REPRESENTATION PROCEDURE

BACKGROUND SECTION

1. Field of the Invention

This invention relates generally to techniques for managing image information, and relates more particularly to a system and method for effectively performing a scene representation procedure.

2. Description of the Background Art

Implementing effective methods for managing image information is a significant consideration for designers and manufacturers of electronic systems. However, effectively implementing these electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports image categorization procedures may benefit from an efficient implementation because of the large amount and complexity of the digital data involved.

Due to growing demands on system resources and substantially increasing data magnitudes, it is apparent that developing new techniques for managing image information is a matter of concern for related electronic technologies. Therefore, for all the foregoing reasons, developing effective systems for managing image information remains a significant consideration for designers, manufacturers, and users of contemporary electronic systems.

SUMMARY

In accordance with the present invention, a system and method are disclosed for effectively performing a scene representation procedure. In accordance with one embodiment of the present invention, an image manager or other appropriate entity initially selects one or more source images for performing the scene representation procedure. The image manager performs a level set-based segmentation procedure from a texture model of image to produce a texture segmentation. The image manager also performs a graph-based segmentation procedure from a contrast model of source image to produce a contrast segmentation.

The image manager then performs a segmentation integration procedure upon the texture segmentation and contrast segmentation to produce an integrated segmentation. The image manager utilizes subscene classifiers and an image database to perform a classifier learning procedure to generate initial labels for the subscenes in the integrated segmentation. The image database may include human knowledge information for individual subscenes in the integrated segmentation. The image manager performs a spatial dependency analysis that evaluates and analyzes each subscene in light of surrounding adjacent subscenes to provide spatial location information for each subscene.

The image manager utilizes a semantic database to perform a subscene rectification procedure upon the initial labels in light of the spatial location information to identify and correct errors in the initial labels. The semantic database may include global human-knowledge information for adjacent subscene labels. This rectification process results in rectified subscenes with spatial dependency information included. The image manager performs a graph analysis procedure to generate an image understanding graph (IU graph) based upon the rectified subscenes.

The image manager then performs a semantic analysis procedure upon the rectified subscenes to refine semantic content and encoding characteristics. In certain embodiments, semantic content refinement may include merging certain appropriate subscenes. The image manager then performs a semantic graph generation procedure to generate a scene representation graph (SR graph). The image manager may then utilize the original source image to perform a semantic segmentation procedure to produce a final segmented image with semantic boundaries.

In accordance with certain embodiments of the present invention, the image manager may analyze a plurality of different source images from a given scene to create an integrated scene representation by utilizing any effective and appropriate techniques. For example, the image manager may create and integrate information from respective IU graphs and SR graphs for each of the different source images to thereby assist in generating the integrated scene representation.

The present invention advantageously provides redesigned robust image segmentation, and handles errors and uncertainty systematically in a Bayesian framework. The present invention also incorporates human knowledge and context info, targets representation for image understanding, and analyzes image components and spatial correlations for graph-based representation. For all the foregoing reasons, the present invention therefore provides an improved a system and method for effectively performing a scene representation procedure

DETAILED DESCRIPTION

The present invention relates to an improvement in scene representation systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing a scene representation procedure, and may include an image manager that processes source images from a given scene to define subscenes in the source images. The image manager creates an image understanding graph for each of the source images, and also creates a scene representation graph for each of the source images based upon the corresponding subscenes and certain other image characteristics. The image manager further generates an integrated scene representation to represent all of the source images with a single representation. A processor of an electronic device controls the image manager to perform the scene representation procedure.

Figure 1:
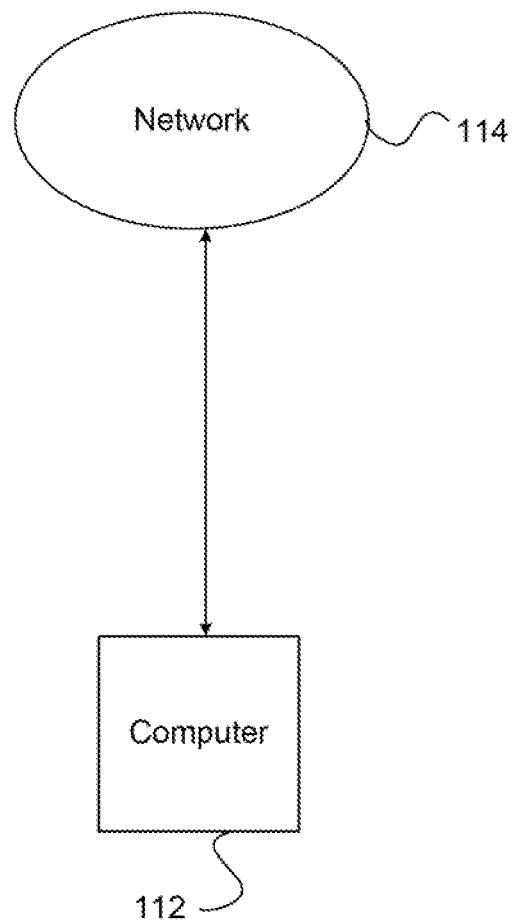
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may include, but is not limited to, a computer 112 and a network 114. In alternate embodiments, electronic system 110 may be implemented using various components and configurations in addition to, or instead of, those discussed in conjunction with the FIG. 1 embodiment. For example, system 110 may readily include any number of other electronic devices in addition to computer 112.

In the FIG. 1 embodiment, computer 112 may be implemented as any electronic device that is configured to support and manage various functionalities in electronic system 110. In the FIG. 1 embodiment, network 114 may include any appropriate entities or devices that communicate with computer 112 via wireless or wired communication techniques. In the FIG. 1 embodiment, computer 112 may perform a scene representation procedure.

In accordance with the present invention, a system is proposed to process an image in such a way that its objects and components can be recognized and their spatial relationships to each other are identified. The system is used to facilitate the process of image understanding and scene classification.

To understand an image automatically, integration of image-level and world-knowledge-level information is necessary. This novel system is designed to fully automate the process of image understanding so that: 1) images are segmented, 2) individual objects in the image are recognized, 3) errors in object recognition are corrected, 4) contents are analyzed, and 4) a semantic graph representation of the image is automatically generated.

Therefore, a system that is capable of automatically processing an image and generating semantic interpretation of the image is proposed. After image segmentation, a series of processes are executed to bring semantic contents of the image to the foreground which is analyzed further to produce a graph representation of the image in which essential content information is represented.

Segmentation and object recognition algorithms are designed to accurately utilize image-level information, while errors and content analysis take advantage of the world-knowledge-level information. These two levels of information are integrated through a Bayesian framework so that the whole system can be robust and is capable to handle complicated image contents.

The system can generate a graph representation of the image contents. This representation is extremely useful in applications targeting image understanding and scene classification. It can also be used to re-segment the image in a way that is not possible using image-level information alone. Any applications that can benefit from understanding images thoroughly can utilize this system. It can also be applicable to video.

A multiple level design may be utilized. Lower level processing such as segmentation can be parallelized, while intermediate level process such as local-area scene recognition and error correction may be in software with possible incremental improvement. The top level semantic analysis of the image may utilize state-of-the-art packages in optimization and Bayesian inference. The implementation and utilization of the present invention is further discussed below in conjunction with FIGS. 2-8.

Figure 2:
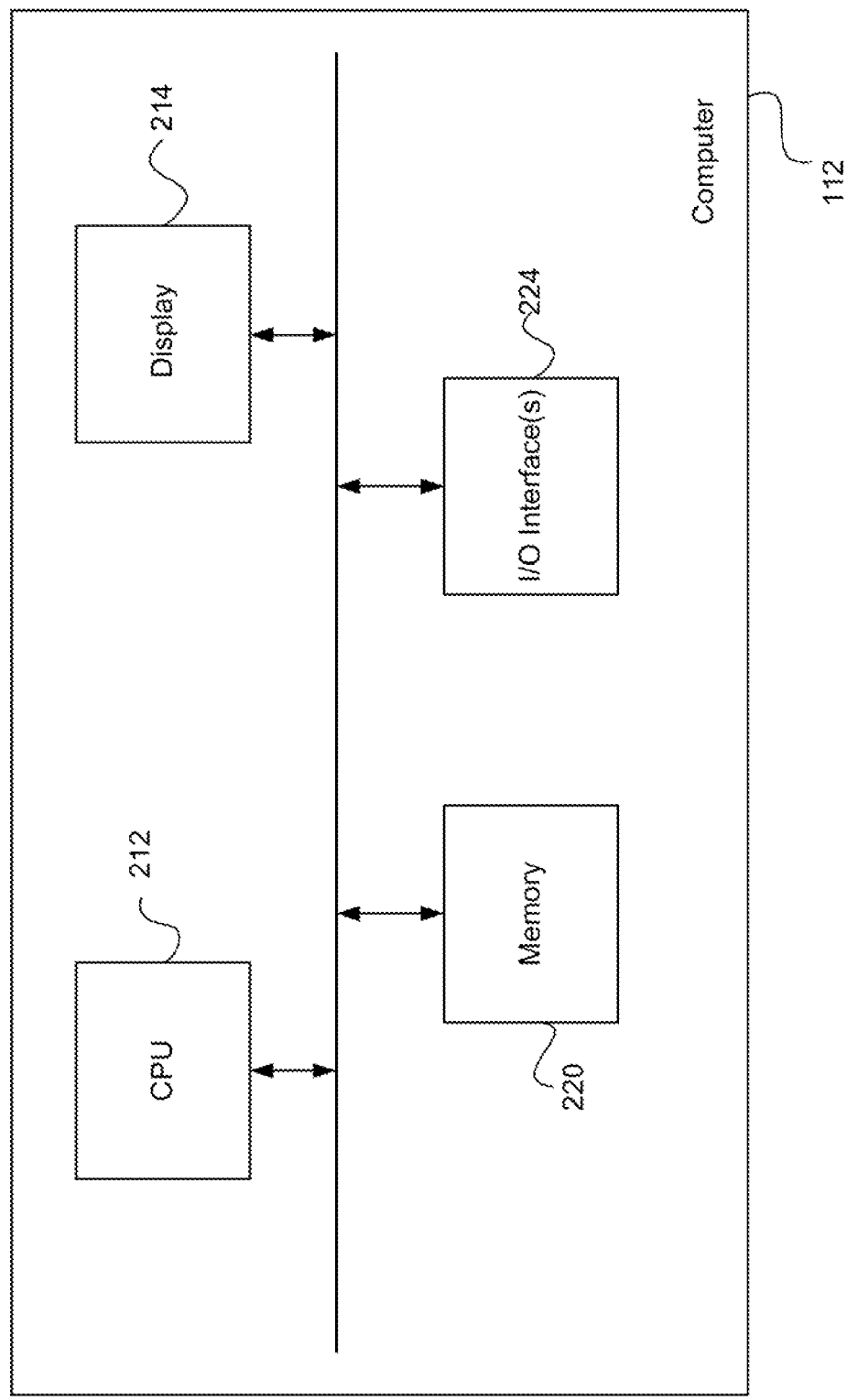
FIG. 2 is a block diagram for one embodiment of the computer of FIG. 1, in accordance with the present invention.

Referring now to FIG. 2, a block diagram for one embodiment of the FIG. 1 computer 112 is shown, in accordance with the present invention. In the FIG. 2 embodiment, computer 112 may include, but is not limited to, a central processing unit (CPU) 212, a display 214, a memory 220, and one or more input/output interfaces (I/O interfaces) 224. In alternate embodiments, computer 112 may be implemented using various components and configurations in addition to, or instead of, those certain of those components and configurations discussed in conjunction with the FIG. 2 embodiment. In addition, computer 112 may alternately be implemented as any other desired type of electronic device or entity.

In the FIG. 2 embodiment, CPU 212 may be implemented to include any appropriate and compatible microprocessor device that preferably executes software instructions to thereby control and manage the operation of computer 112. The FIG. 2 display 214 may include any effective type of display technology including a cathode-ray-tube monitor or a liquid-crystal display device with an appropriate screen for displaying various information to a device user.

In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, I/O interfaces 224 may preferably include one or more input and/or output interfaces to receive and/or transmit any required types of information for computer 112. For example, in the FIG. 2 embodiment, computer 112 may utilize I/O interfaces 224 to communicate with network 114 (see FIG. 1). In addition, a system user may utilize I/O interfaces 224 to communicate with computer 112 by utilizing any appropriate and effective techniques. The implementation and utilization of the FIG. 2 computer 112 is further discussed below in conjunction with FIGS. 3-8.

Figure 3:
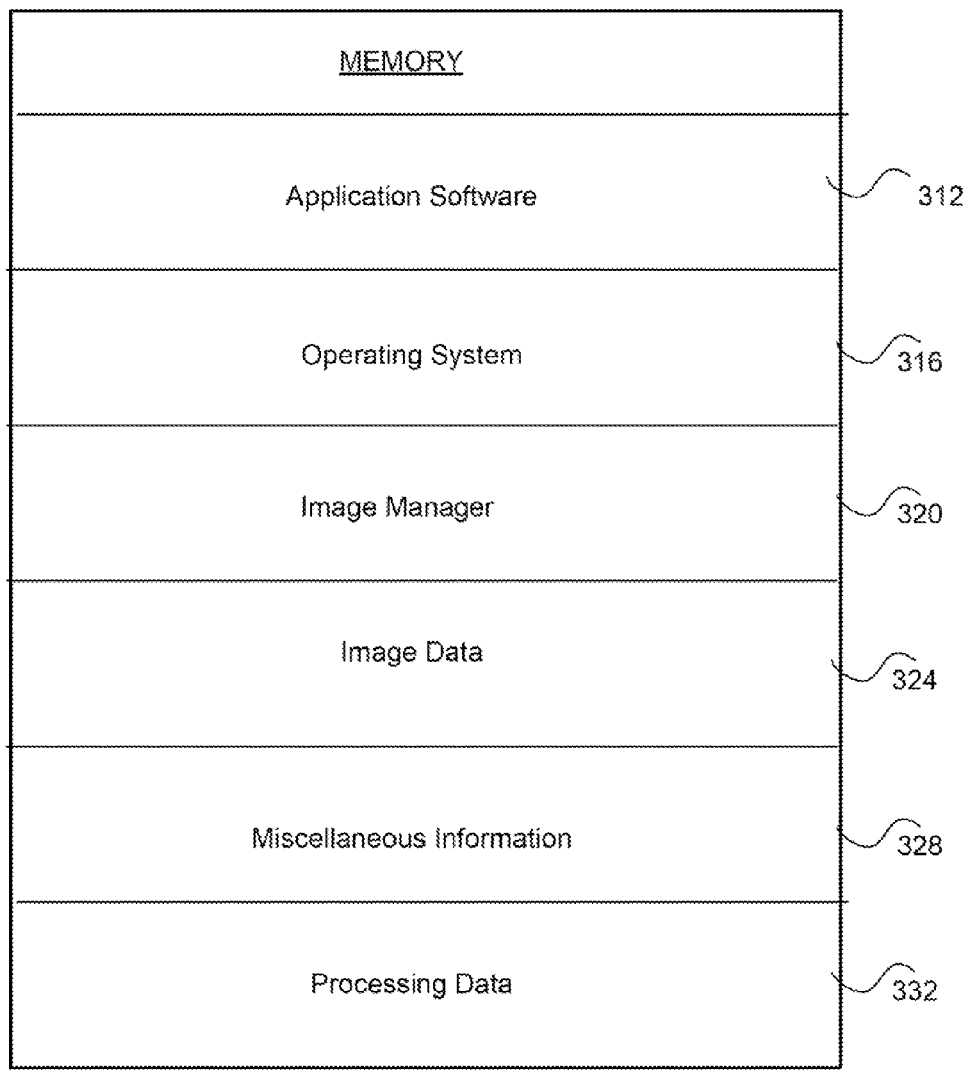
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 includes, but is not limited to, application software 312, an operating system 316, an image manager 320, image data 324, miscellaneous information 328, and processing data 332. In alternate embodiments, memory 220 may include various other components and functionalities in addition to, or instead of, certain those components and functionalities discussed in conjunction with the FIG. 3 embodiment.

In the FIG. 3 embodiment, application software 312 may include program instructions that are preferably executed by CPU 212 (FIG. 2) to perform various functions and operations for computer 112. The particular nature and functionality of application software 312 preferably varies depending upon factors such as the specific type and particular functionality of the corresponding computer 112.

In the FIG. 3 embodiment, operating system 316 preferably controls and coordinates low-level functionality of computer 112. In the FIG. 3 embodiment, image manager 320 may utilize image data 324 to effectively perform various scene representation procedures, in accordance with the present invention. In the FIG. 3 embodiment, miscellaneous information 328 may include any additional information or data required by computer 112 or image manager 320. In the FIG. 3 embodiment, processing data 332 may include any temporary or permanent information or data required by computer 112 or image manager 320 for performing scene representation procedures.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. The implementation and utilization of image manager 320 are further discussed below in conjunction with FIGS. 4 through 8.

Figure 4A:
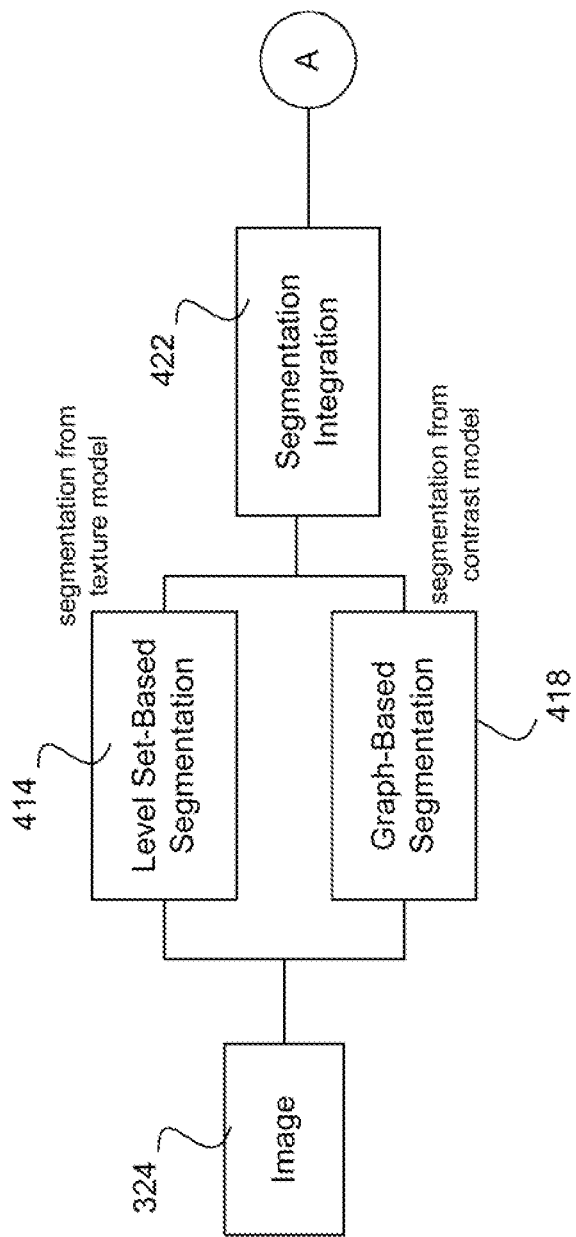
FIGS. 4A-4C are a diagram of one embodiment for performing a scene representation procedure, in accordance with the present invention.
Figure 4B:
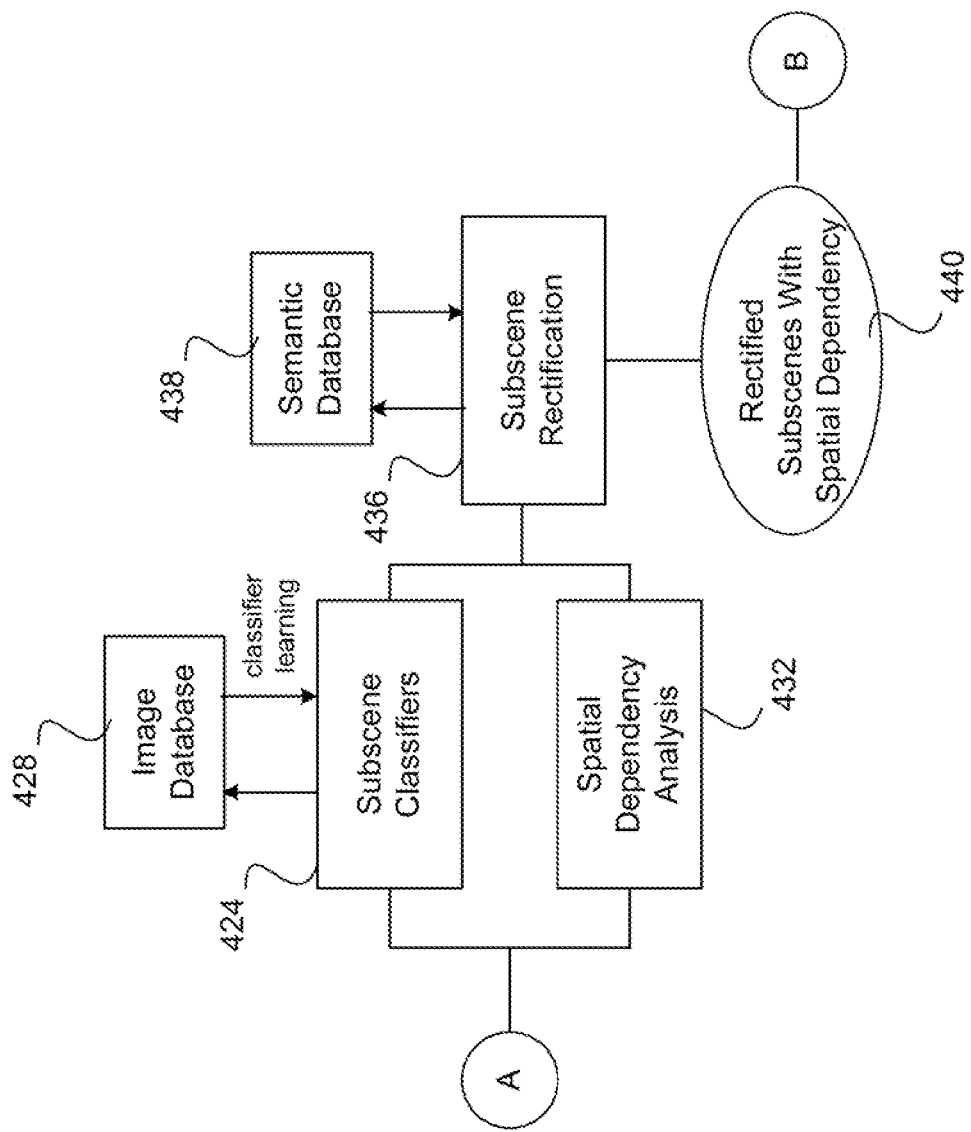
Figure 4C:
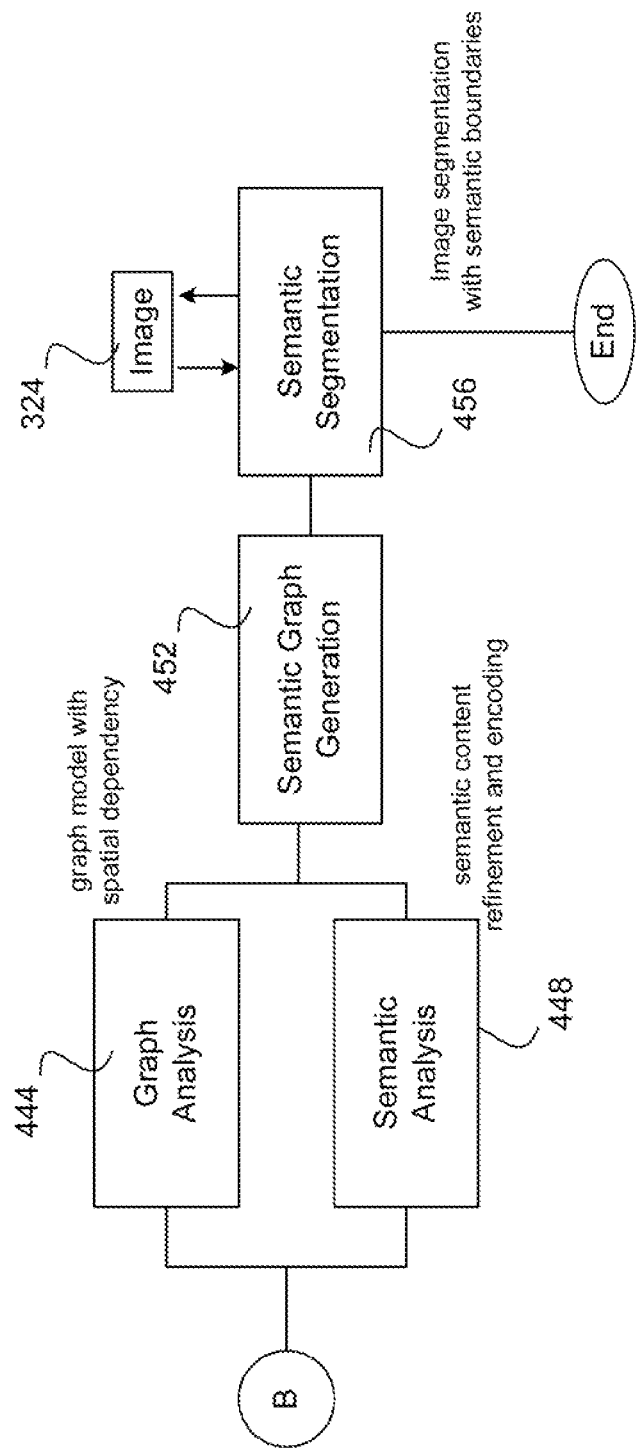

Referring now to FIGS. 4A-4C, a diagram illustrating a scene representation procedure is shown, in accordance with one embodiment of the present invention. The FIG. 4 embodiment is presented for purposes of illustration, and in alternate embodiments, scene representation procedures may be performed using various steps and functionalities in addition to, or instead of, certain of those steps and functionalities discussed in conjunction with the FIG. 4 embodiment. The scene representation procedure of FIG. 4 may be performed and coordinated by an image manager 320 (FIG. 3) or other appropriate entity(s).

In the FIG. 4A, image manager 320 or other appropriate entity initially selects at least one source image 324 for performing the scene representation procedure. In step 414, image manager 320 performs a level set-based segmentation procedure from a texture model of image 324 to produce a texture segmentation. In step 418, image manager 320 performs a graph-based segmentation procedure from a contrast model of image 324 to produce a contrast segmentation.

In step 422, image manager 320 performs a segmentation integration procedure upon the texture segmentation and contrast segmentation to produce an integrated segmentation. Certain techniques for performs steps 414, 418, and 422 are further discussed in U.S. patent application Ser. No. 13/065,852 entitled "System and Method For Effectively Performing An Integrated Segmentation Procedure," filed on Mar. 31, 2011, which is hereby incorporated by reference. The FIG. 4A process then advances to FIG. 4B through connecting letter "A."

In step 424, image manager 320 utilizes subscene classifiers and image database 428 to perform a classifier learning procedure to generate initial labels for the subscenes in the integrated segmentation. In the FIG. 4 embodiment, image database 428 may include human knowledge information for individual subscenes in the integrated segmentation. In step 432, image manager 320 performs a spatial dependency analysis that evaluates and analyzes each subscene in light of surrounding adjacent subscenes to provide spatial location information for each subscene.

In step 436, image manager 320 utilizes a semantic database 438 to perform a subscene rectification procedure upon the initial labels in light of the spatial location information to identify and correct errors in the initial labels. In the FIG. 4 embodiment, semantic database 438 may include global human-knowledge information for adjacent subscene labels. This rectification process results in rectified subscenes 440 with spatial dependency information included. Certain techniques for performs steps 424, 432, and 436 are further discussed in U.S. patent application Ser. No. 12/932,457 entitled "System And Method For Effectively Performing A Scene Rectification Procedure," filed on Feb. 25, 2011, which is hereby incorporated by reference. The FIG. 4B process then advances to FIG. 4C through connecting letter "B."

In step 444, image manager 320 performs a graph analysis procedure to generate an image understanding graph (IU graph) based upon the rectified subscenes. Additional information regarding IU graphs is further discussed below in conjunction with FIGS. 5 and 6. In step 448, image manager 320 performs a semantic analysis procedure upon the rectified subscenes to refine semantic content and encoding characteristics. In the FIG. 4 embodiment, semantic content refinement may include merging certain appropriate subscenes.

In step 452, image manager 320 performs a semantic graph generation procedure to generate a scene representation graph (SR graph) based upon the IU graph and the results of the semantic analysis. Additional information regarding SR graphs is further discussed below in conjunction with FIGS. 5 and 7. In step 456, image manager 320 utilizes the original image 324 to perform a semantic segmentation procedure to produce a final segmented image with semantic boundaries.

The present invention advantageously provides redesigned robust image segmentation, and handles errors and uncertainty systematically in a Bayesian framework. The present invention also incorporates human knowledge and context info, targets representation for image understanding, and analyzes image components and spatial correlations for graph-based representation. Additional details and techniques for performing the foregoing scene representation procedure are further discussed below in conjunction with FIGS. 5-8.

Figure 5:
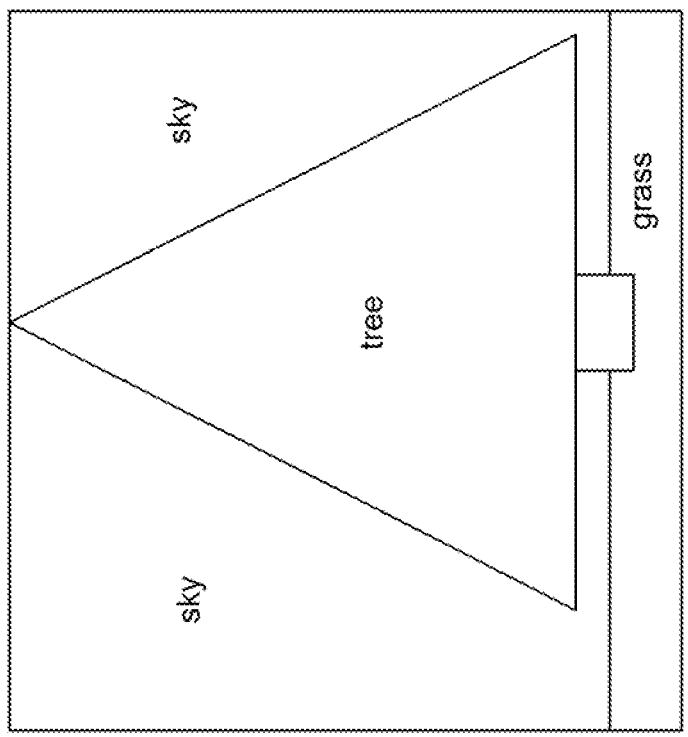
FIG. 5 is a diagram of an exemplary image, in accordance with one embodiment of the present invention.

Referring now to FIG. 5, a diagram illustrating an exemplary image 324 is shown, in accordance with one embodiment of the present invention. The FIG. 5 diagram is presented for purposes of illustration, and in alternate embodiments, image 324 may include various elements, subscenes, and regions in addition to, or instead of, certain of those elements, subscenes, and regions discussed in conjunction with the FIG. 5 embodiment.

In the FIG. 5 embodiment, image 324 is shown with exemplary elements that include, but are not limited to, a large tree, some grass, and two regions of sky on either side of the tree. In accordance with the present invention, image manager 320 may perform a scene analysis procedure to identify local semantics and global semantics corresponding to image 324. In certain embodiments, local semantics may include, but are not limited to, labels of the subscene regions, sizes of the subscene regions, and the locations of the subscene regions within image 324. In addition, the global semantics may include, but are not limited to, spatial connectivities of the subscene regions.

Figure 6:
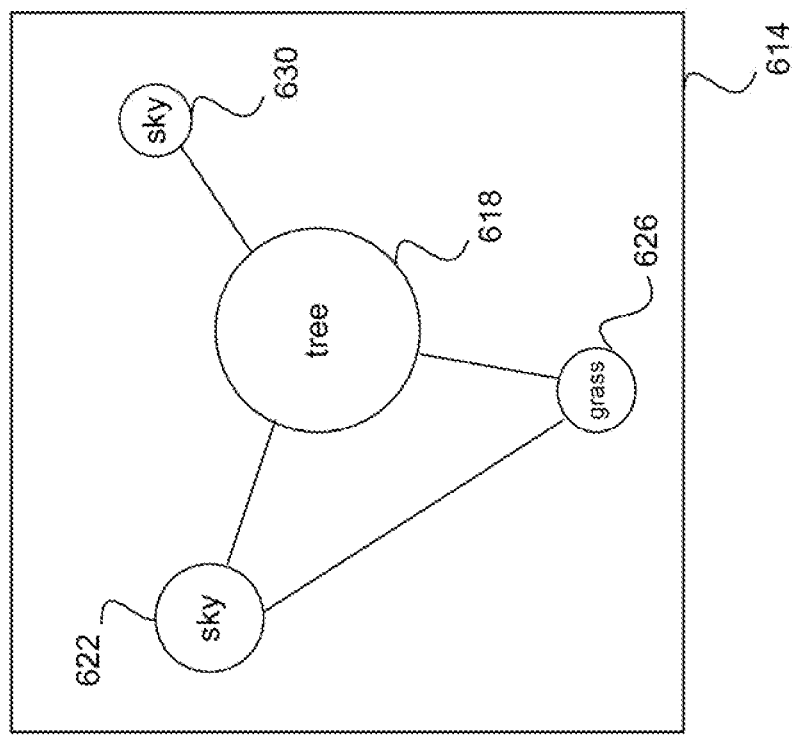
FIG. 6 is a diagram of an image understanding graph for the FIG. 5 image, in accordance with one embodiment of the present invention.

Referring now to FIG. 6, an image understanding (IU) graph 614 corresponding to the FIG. 5 image 324 is shown, in accordance with one embodiment of the present invention. The FIG. 6 diagram is presented for purposes of illustration, and in alternate embodiments, IU graphs 614 may include various elements and configurations in addition to, or instead of, certain of those elements and configurations discussed in conjunction with the FIG. 6 embodiment.

In the FIG. 6 embodiment, IU graph 614 includes a tree node 618, a grass node 626, a first sky node 622, and a second sky node 630 that each represent corresponding subscenes in image 324. The relative size of each subscene is represented by the size of the corresponding node. Similarly, the position of each subscene is represented by the position of the corresponding node. Spatial connectivity of various subscenes are expressed by edge lines that connect appropriate pairs of the subscenes. For example, tree 618 is connected to all three of the other nodes by edge lines.

In IU graph 614, for image understanding, local semantics are represented at graph nodes, global semantics are represented by graph edges, and non-adjacent regions of same labels are not merged. In certain embodiments, image manager 320 may provide an image understanding description based upon IU graph 614. For example, the image understanding description may state that "An image depicts a large tree with grass in foreground. Patches of sky are visible at upper left and right corners." IU graph 614 thus represents an individual image 324 and encodes local and global image semantics.

Figure 7:
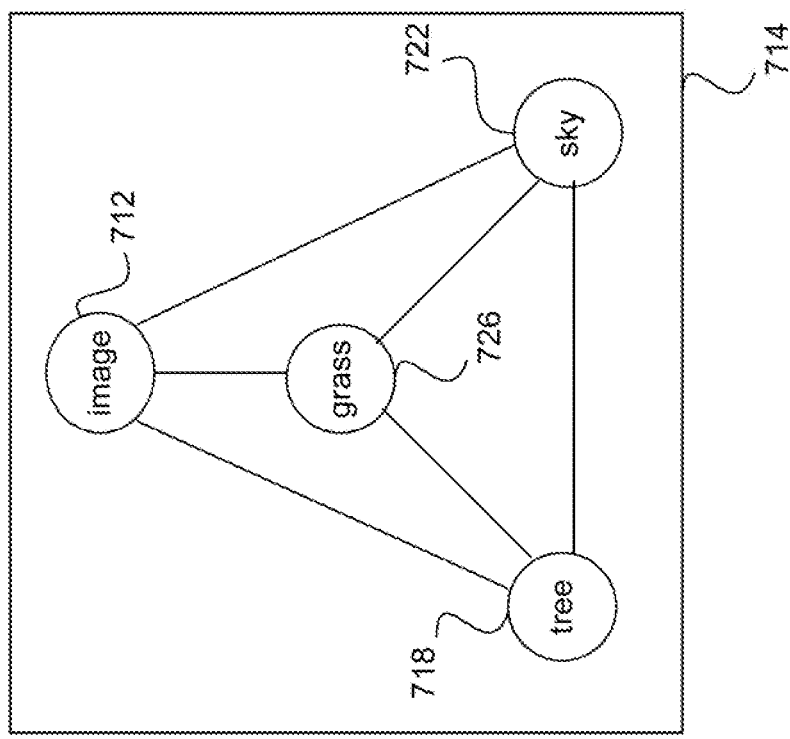
FIG. 7 is a diagram of a scene representation graph for the FIG. 5 image, in accordance with one embodiment of the present invention.

Referring now to FIG. 7, a scene representation (SR) graph 714 for the FIG. 5 image 324 is shown, in accordance with one embodiment of the present invention. The FIG. 7 diagram is presented for purposes of illustration, and in alternate embodiments, SR graphs 714 may include various elements and configurations in addition to, or instead of, certain of those elements and configurations discussed in conjunction with the FIG. 7 embodiment.

In the FIG. 7 embodiment, SR graph 714 includes an image node 712, a tree node 718, a grass node 726, and a sky node 722. Unlike the foregoing IU graph 614, SR graph 714 does not contain subscene size information since all the nodes are the same size. In addition, location information for the various subscenes is not included in SR graph 714.

In SR graph 714, for scene classification, region labels are only represented locally, adjacencies are only represented globally, and subscene regions with the same labels are merged globally. In certain embodiments, image manager 320 may provide a scene classification description based upon SR graph 714. For example, the scene classification description may be "A scene with trees, grass and sky." SR graph 714 thus represents scene component composition, encodes subscene groups as scene semantics, and has associated probabilistic assignments in semantics. In accordance with certain embodiments of the present invention, image manager 320 may utilize a IU graph 614 to generate a corresponding SR graph 714.

Figure 8:
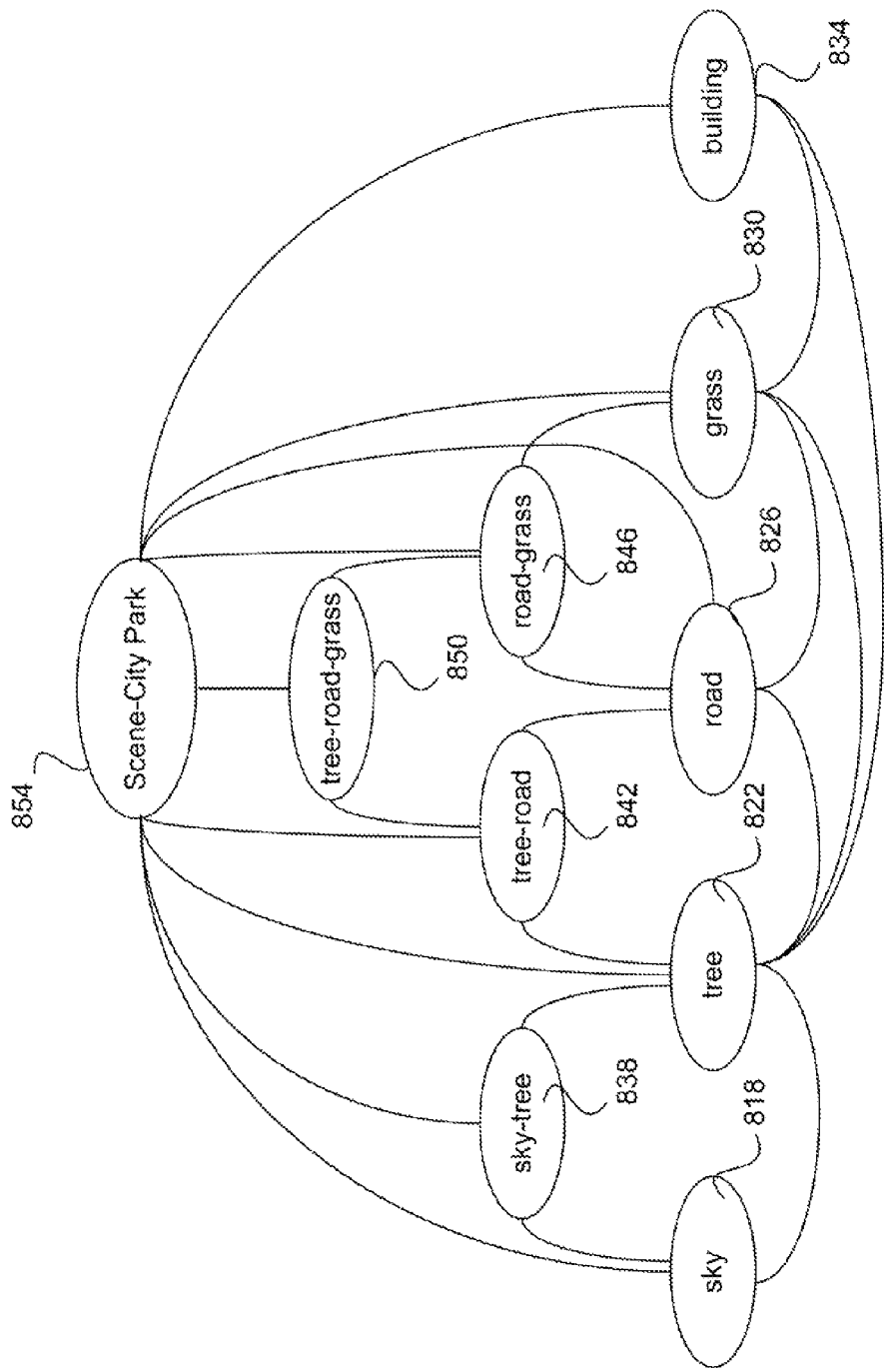
FIG. 8 is a diagram of an integrated scene representation, in accordance with one embodiment of the present invention.

Referring now to FIG. 8, an integrated scene representation 814 is shown, in accordance with one embodiment of the present invention. The FIG. 8 diagram is presented for purposes of illustration, and in alternate embodiments, integrated scene representations 814 may include various elements and configurations in addition to, or instead of, certain of those elements and configurations discussed in conjunction with the FIG. 8 embodiment.

In accordance with certain embodiments of the present invention, image manager 320 may analyze a plurality of different source images 324 from a given scene to create an integrated scene representation 814 by utilizing any effective and appropriate techniques. For example, image manager 320 may create IU graphs 614 and SR graphs 714 for each of the different source images 324 to thereby assist in generating the integrated scene representation 814.

In the FIG. 8 embodiment, scene representation 814 includes a scene definition node 854 which in this example is a "City Park." Scene representation 814 also includes a series of subscene nodes that correspond to subscenes from the various different source images 324. In the FIG. 8 example, these subscene nodes include a sky node 818, a tree node 822, a road node 826, a grass node 830, and a building node 834.

In accordance with the present invention, scene representations may include any appropriate number of higher-level subscene group nodes that represent adjacent relationships between two or more of the subscene nodes. In the FIG. 8 embodiment, scene representation 814 includes three first-level subscene group nodes named "sky-tree" 838, "tree-road" 842, and "road-grass" 846. The FIG. 8 embodiment also includes a second-level subscene group node names "tree-road-grass" 850.

By generating and utilizing scene representation 814, IU graph 614 (FIG. 6), and SR graph 714 (FIG. 7), the present invention advantageously provides several different tools for managing image data. For example, uncategorized images may be categorized by matching them with a scene representation 814 for a known scene. The present invention thus provides effective means for representing diverse images and their contents in detail, handling errors and missing information systematically, incorporating context information into the representations, and providing scene classes that are user-definable.

The present invention also provides means for representing images such that essential content elements are recognized and are consistent with human perception and knowledge, semantic relationships between elements are represented, and important applications may be facilitated from the representations. The present invention further provides means for representing scenes defined by image sets such that individual image representations are integrated, relevant common elements across images are specifically represented, uncertainty between scene elements may be reasoned, and powerful applications may be build from the scene representations. For all the foregoing reasons, the present invention provides an improved system and method for performing a scene representation procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing a scene representation procedure, comprising:
    an image manager that processes a source image to define subscenes in said source image, said image manager creating an image understanding graph based upon said subscenes, said image manager also generating a scene representation graph based upon said subscenes, said image understanding graph and said scene representation graph being different from each other and from said source image; and
    a processor of an electronic device that controls said image manager to perform said scene representation procedure.

2. The system of claim 1 wherein said image understanding graph includes subscene labels, subscene location information, subscene size information, and subscene spatial connectivity information.

3. A system for performing a scene representation procedure, comprising:

an image manager that processes a source image to define subscenes in said source image, said image manager creating an image understanding graph based upon said subscenes, said image manager also generating a scene representation graph based upon said subscenes, said scene representation graph including subscene labels and subscene connectivity information without subscene location information and subscene size information; and a processor of an electronic device that controls said image manager to perform said scene representation procedure.

4. The system of claim 3 wherein said image manager merges identical subscene labels in said scene representation graph.

5. The system of claim 1 wherein said image manager creates an image understanding description based upon said image understanding graph.

6. The system of claim 1 wherein said image manager creates a scene classification description based upon said image understanding graph.

7. The system of claim 1 wherein said image manager creates an integrated scene representation to represent a plurality of source images from a selected scene.

8. The system of claim 7 wherein said integrated scene representation includes a scene definition node that identifies said selected scene.

9. The system of claim 8 wherein said scene definition node is specified by a system user.

10. The system of claim 7 wherein said integrated scene representation includes subscene nodes from said plurality of source images.

11. The system of claim 10 wherein said integrated scene representation includes one or more first-level subscene group nodes that represent adjacent pairs of said subscene nodes.

12. The system of claim 11 wherein said integrated scene representation includes at least one second-level subscene group node that represents an adjacent pair of said first-level subscene group nodes.

13. The system of claim 1 wherein said image manager creates said scene representation graph based upon said image understanding graph.

14. The system of claim 7 wherein said image manager creates said integrated scene representation by utilizing respective ones of said scene representation graph and said image understanding graph corresponding to said plurality of source images.

15. The system of claim 7 wherein said image manager assigns an uncategorized image to an appropriate scene by matching characteristics of said uncategorized image to said integrated scene representation.

16. The system of claim 1 wherein said image manager performs a segmentation procedure upon said source image to produce a segmented image.

17. The system of claim 16 wherein said image manager assigns subscene labels to said segmented image by utilizing local human knowledge information in an image database.

18. The system of claim 17 wherein said image manager performs a subscene rectification procedure upon said subscene labels by utilizing global human knowledge information in a semantic database.

19. The system of claim 18 wherein said image manager performs a semantic refinement procedure by merging at least one similar pair of said subscene labels.

20. A method for performing a scene representation procedure, comprising the steps of:

processing a source image to define subscenes in said source image;

creating an image understanding graph based upon said subscenes and generating a scene representation graph based upon said subscenes, said image understanding graph and said scene representation graph being different from each other and from said source image.

* * * * *